United States Patent
Alleaume et al.

(10) Patent No.: US 10,805,075 B2
(45) Date of Patent: Oct. 13, 2020

(54) PHASE REFERENCE SHARING SCHEMES FOR CONTINUOUS-VARIABLE QUANTUM CRYPTOGRAPHY

(71) Applicant: INSTITUT MINES-TELECOM, Paris (FR)

(72) Inventors: Romain Alleaume, Paris (FR); Adrien Marie, Versailles (FR)

(73) Assignee: INSTITUT MINES-TELECOM, Paris (FR)

(*) Notice: Subject to any disclaimer, the term of this patent is extended or adjusted under 35 U.S.C. 154(b) by 84 days.

(21) Appl. No.: 16/098,829

(22) PCT Filed: May 10, 2017

(86) PCT No.: PCT/EP2017/061136
§ 371 (c)(1),
(2) Date: Nov. 2, 2018

(87) PCT Pub. No.: WO2017/194582
PCT Pub. Date: Nov. 16, 2017

(65) Prior Publication Data
US 2019/0199523 A1     Jun. 27, 2019

(30) Foreign Application Priority Data
May 11, 2016 (EP) .................................. 16305551

(51) Int. Cl.
*H04L 9/08* (2006.01)
*H04B 10/70* (2013.01)
(Continued)

(52) U.S. Cl.
CPC ........... *H04L 9/0858* (2013.01); *H04B 10/70* (2013.01); *H04L 9/0852* (2013.01); *G06F 17/11* (2013.01); *H04L 12/2856* (2013.01)

(58) Field of Classification Search
CPC ....... H04L 9/0858; H04L 9/0852; H04L 9/08; H04L 12/28; H04L 12/2856; H04B 10/70; H04B 10/63; G06F 17/11
See application file for complete search history.

(56) References Cited

U.S. PATENT DOCUMENTS 9,077,577 B1 * 7/2015 Ashrafi ............... H04L 27/3405
9,553,677 B1 * 1/2017 Soh ........................ H04B 10/70
(Continued)

FOREIGN PATENT DOCUMENTS

CN         104 539 582 A       4/2015

OTHER PUBLICATIONS

Eleni Diamanti, "Practical secure quantum communications," Proc. SPIE 9505, Quantum Optics and Quantum Information Transfer and Processing 2015, (Year: 2015).*
(Continued)

*Primary Examiner* — Jayesh M Jhaveri
(74) *Attorney, Agent, or Firm* — Baker & Hostetler LLP

(57) ABSTRACT

Systems and associated methods of performing coherent optical communication of quantum information between an emitter A and a distant receiver B are provided, using a local local oscillator. Examples of LLO-based Continuous-Variable Quantum Key Distribution are described. Self-coherent schemes are used, the schemes consisting in deriving both signal and phase reference pulses from the same optical pulse thus ensuring an intrinsic strong signal to reference phase coherence. Different CV-QKD designs implementing various self-coherence phase sharing schemes are described and compared in terms of secret key rate and hardware requirements. Strong phase noise resilience can be obtained with standard telecom equipment such as low cost lasers.

12 Claims, 4 Drawing Sheets

(51) Int. Cl.
*H04L 12/28* (2006.01)
*G06F 17/11* (2006.01)

(56) References Cited

U.S. PATENT DOCUMENTS

| | | | | |
|---|---|---|---|---|
| 2004/0109564 | A1* | 6/2004 | Cerf | H04L 9/0858 |
| | | | | 380/256 |
| 2006/0262930 | A1* | 11/2006 | Dinu | H04L 9/0858 |
| | | | | 380/256 |
| 2009/0268901 | A1* | 10/2009 | Lodewyck | H04L 9/0852 |
| | | | | 380/41 |
| 2017/0078029 | A1* | 3/2017 | Qi | H04L 7/0008 |
| 2020/0204362 | A1* | 6/2020 | Li | G06N 10/00 |

OTHER PUBLICATIONS

Soh, et al., "Self-Referenced Continuous-Variable Quantum Key Distribution Protocol", Phys. Rev., vol. 5, No. 4, Oct. 1, 2015.
Qi, et al., "Generating the local oscillator "locally" in continuous-variable quantum key distribution based on coherent detection", Phys. Rev., vol. 5, No. 4, Oct. 1, 2015.
Marie, et al., "Self-coherent phase reference sharing for continuous-variable quantum key distribution", Phys. Rev., May 12, 2016.
Diamanti, et al., "Practical secure quantum communications ", vol. 9505, pp. 95050L1-13, May 5, 2015.
Luis, et al., "Coherent detection in self-homodyne systems with single and multi-core transmission", Proceedings, vol. 9389, pp. 93890P1-13, Jan. 15, 2015.

* cited by examiner

PHASE REFERENCE SHARING SCHEMES FOR CONTINUOUS-VARIABLE QUANTUM CRYPTOGRAPHY

CROSS-REFERENCE TO RELATED APPLICATIONS

This application is a National Stage of International patent application PCT/EP2017/061136, filed on May 10, 2017, which claims priority to foreign European patent application No. EP 16305551.0, filed on May 11, 2016, the disclosures of which are incorporated by reference in their entirety.

TECHNICAL FIELD

The invention generally relates to the field of quantum cryptography and in particular to continuous-variable quantum cryptography.

BACKGROUND

Recently, a new Continuous-Variable Quantum Key Distribution (CV-QKD) protocol, self-referenced CV-QKD, has been introduced in the document entitled "*Self-Referenced Continuous-Variable Quantum Key Distribution*" by D. B. S. Soh, C. Brif, P. J. Coles, N. Lütkenhaus, R. M. Camacho, J. Urayama and M. Sarovar (arXiv:1503.04763, 2015) introduces. This Continuous-Variable Quantum Key Distribution (CV-QKD) protocol eliminates the need for transmission of a high-power local oscillator between the communicating parties. In this protocol, each signal pulse is accompanied by a reference pulse (or a pair of twin reference pulses), used to align Alice's and Bob's measurement bases. This protocol provides a method of phase estimation and compensation based on the reference pulse measurement which can be viewed as a quantum analog of intradyne detection used in classical coherent communication, which extracts the phase information from the modulated signal. There is also disclosed a proof-of-principle fiber-based experimental demonstration of the protocol and quantified the expected secret key rates by expressing them in terms of experimental parameters. The analysis of the secret key rate allegedly takes into account the inherent uncertainty associated with the quantum nature of the reference pulse(s) and quantifies the limit at which the theoretical key rate approaches that of the respective conventional protocol that requires local oscillator transmission. The self-referenced protocol allegedly simplifies the hardware required for CV-QKD, especially for potential integrated photonics implementations of transmitters and receivers, with minimum sacrifice of performance. As such, it provides a pathway towards scalable integrated CV-QKD transceivers, a vital step towards large-scale QKD networks.

Continuous-variable quantum key distribution (CV-QKD) protocols based on coherent detection have been studied extensively in both theory and experiment, as disclosed in the document entitled "Locally" in *Continuous-Variable Quantum Key Distribution Based on Coherent Detection*" by B. Qi, P. Lougovski, R. Pooser, W. Grice, and M. Bobrek, Generating the Local Oscillator (arXiv:1503.00662, 2015). In all the existing implementations of CV-QKD, both the quantum signal and the local oscillator (LO) are generated from the same laser and propagate through the insecure quantum channel. This arrangement may open security loopholes and limit the potential applications of CV-QKD. In the latter document, the authors disclose a pilot-aided feedforward data recovery scheme which enables reliable coherent detection using a "locally" generated LO. Using two independent commercial laser sources and a spool of 25 kilometers optical fiber, there is disclosed a coherent communication system. The variance of the phase noise introduced by the proposed scheme is measured to be 0.04 (rad2), which is small enough to enable secure key distribution. This technology allegedly opens the door for other quantum communication protocols, such as the recently proposed Measurement-Device-Independent (MDI) CV-QKD where independent light sources are employed by different users.

The two approaches described in [Qi15] and [Soh15] present practical limitations.

There is accordingly a need for advanced methods and systems of handling continuous-variable quantum key distribution (CV-QKD) frameworks.

SUMMARY

In order to address these and other problems, there are provided systems and methods of performing coherent optical communication of quantum information between an emitter A and a distant receiver B, using a local local oscillator (LLO). Examples of LLO-based Continuous-Variable Quantum Key Distribution (CV-QKD) are described. Self-coherent schemes are used which consist in deriving both signal and phase reference pulses from the same optical pulse thus ensuring an intrinsic strong signal to reference phase coherence. Different CV-QKD embodiments implementing various self-coherence phase sharing schemes are further described and compared in terms of secret key rate and hardware requirements. Strong phase noise resilience can be obtained with standard telecom equipment such as low cost lasers.

Advantageously, the implementation of the invention can be discovered in several ways.

In an embodiment (referred to as design "LLO-outb-sc-dsp"), two lasers can be used: a first one on Alice's side and a second one on Bob's side. On Alice's side, there are two optical paths. One is delayed. On Bob's side, there are two homodyne detectors.

In an embodiment (referred to as design "LLO-outb-sc-opll"), two lasers can be used, with one laser on Alice's side and a second laser on Bob's side, with two optical paths on Alice's side, one laser being delayed, while on Bob's side, the incoming optical path is split into two parts. Each one interferes with the local oscillator. One is measured using a photodiode and the other is measured using a homodyne detection.

In an embodiment (referred to as design "LLO-inb"), two lasers can be used with one on Alice's side and a second one on Bob's side. On Alice's side, there is only one optical path with one amplitude modulator and one phase modulator while on Bob's side there are two homodyne detectors.

Among other applications, the proposed technology can be applied to one or more of the following use cases: implementation of quantum key distribution with integrated photonics, implementation of quantum key distribution compatible with standard optical networks, WDM networks, DWDM networks, implementation of continuous variable quantum key distribution with local local oscillator and low cost lasers, such as distributed feedback lasers (DFB).

BRIEF DESCRIPTION OF DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Figure 1:
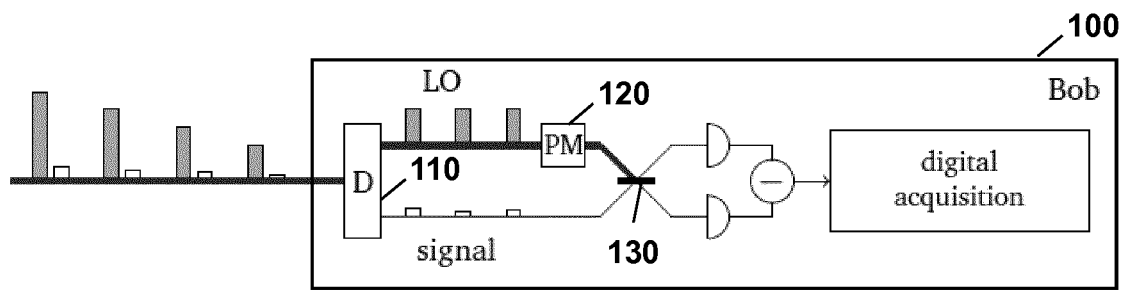
FIG. 1 shows an embodiment of Bob's receiver 100 in the TLO design.

Additionally, the detailed description is supplemented with an Exhibit 1. This Exhibit 1 is placed apart for the purpose of clarifying the detailed description, and of enabling easier reference. It nevertheless forms an integral part of the description of the present invention. This applies to the drawings as well.

DETAILED DESCRIPTION

Making reference to certain features of the invention involves certain conventions in notation. For example, in the detailed description, expressions X(i) or Xi will be used equivalently to indicate that X is a function of i. Further, the capital letter "A" will be used to designate Alice, the capital letter "B" will be used to designate Bob, and the capital letter "E" will be used to designate Eve.

Examples of schemes for sharing a phase reference in practical CV-QKD according to embodiments of the invention are now described and discussed.

To facilitate the understanding of certain embodiments, nomenclatures regarding the general classification of local oscillator (LO) intensity generation techniques are first described.

Different general kinds of CV-QKD based on their LO intensity generation method can be distinguished, including Transmitted LO (TLO) and Local LO (LLO).

Regarding a transmitted LO (TLO), the intensity of the LO is generated by Alice's laser and transmitted together with each signal pulse as a bright pulse which commonly requires multiplexing techniques. The required coherence between signal and LO pulses is then directly physically ensured. When the LO is directly sent through the quantum channel, the launched intensity required increases with the distance (because of losses) and the repetition rate (because of shorter pulses) in order to ensure a low velec.

The light beam is output from a continuous laser while the pulse shape is created with high extinction amplitude modulators. The output beam is split using a strongly unbalanced beam-splitter. The strong beam is sent to Bob as the LO while the weak beam is modulated to get the CV-QKD signal. At the i-th pulse, Alice randomly picks zero-mean Gaussian distributed variables x(i) and p(i) and modulates the coherent state $|\alpha i\rangle = |xA, pA\rangle$. Then, Alice simultaneously sends both the LO pulse and the corresponding signal pulse to Bob using multiplexing techniques. It should be noted that the pulses are automatically phase-locked as output of the same beam and thus phase noise is not considered because of self-coherence. At reception, Bob demultiplexes the pulses and randomly measures one of the X or P quadrature of the signal pulse $|\alpha i\rangle$ using the associated LO pulse. This detection is called a self-coherent homodyne detection because both the signal and the LO come from the same laser. This TLO design corresponds to the most commonly implemented version of the GMCS (Gaussian Modulated Coherent State) protocol.

Regarding a Local LO (LLO), the intensity of the LO is locally generated at Bob's side using a second laser. Thus, Bob totally controls the intensity of the LO which no longer depends on the distance. Thereby, the intensity of the LO can be considered as trusted. However, a high phase noise arises from the relative phase drift of the two lasers and has to be corrected. In order to make Bob able to recover correlations, Alice has to send information on her phase reference. Two subtypes of LLO methods can be distinguished depending on the kind of the phase reference processing. In analog phase-locking, the two lasers are phase-locked using a phase-lock loop (PLL) and a feedback to physically control the phase of Bob's laser in order to ensure the coherence at interference. There can be maintained a constant phase difference between the two lasers. In digital signal processing (DSP) phase-locking, the phase reference is regularly estimated using measurement results. Thus, Bob can digitally correct the measurements in order to restore the coherence a posteriori.

In the LLO-outband design, Alice sends the same signal pulses as in the TLO design while Bob uses his own laser as the LO for coherent detection. Thereby, a fast phase noise arises from the relative phase drift between Alice's and Bob's laser. In order to transmit her phase reference, Alice sends phase information using dedicated reference pulses. Alice uses a fraction r of the pulses to send reference pulses. To some extent, this can be seen as a time-multiplexing technique. Phase reference pulses are relatively bright pulses, compared to signal, and have a publicly known and fixed phase so that Bob can estimate the relative phase drift. There can used the maximal amplitude rmax allowed by the modulators to send as much information as possible on the phase reference. Doing this, Bob can correct the phase noise while the intensity on the quantum channel is still much lower than LO pulses in the TLO design. In order to evaluate the relative phase, Bob has to measure both X and P quadratures of each reference pulses using a heterodyne detection. Then, he can correct his i-th signal measurement using the (i−1)-th and (i+1)-th phase estimation. As the signal and the phase reference pulses suffer from a differential phase noise because of delayed emission, it will be referred to this design as the "LLO-outband-diff design". A proof-of-principle of the GMCS (Gaussian Modulated Coherent State) protocol with an implementation of the phase correction based on this design (both with r=½) can be demonstrated.

Limitations of existing designs are now interpreted and discussed.

Regarding the TLO design, the intensity Imax prevents for high repetition rates in the TLO design. It is emphasized that, in this design, the variance velec depends on both the distance and the repetition rate because the shot noise is proportional to the LO photon number. For instance, in order to provide a 10^8 photons LO pulse at Bob's side at 1 GHz on a 20 dB loss channel, the required LO power at input is about 1.2 W at 1550 nm which is much larger than experimental Imax values. Inversely, for a given launch laser intensity at Alice's side, the photon number in each LO pulses at Bob's side decreases with the distance and the repetition rate and thus the electronic to shot noise ratio increases.

Regarding the LLO-sequential design, high repetition rates allow the use of a local LO. In practice, a local LO implies that Bob uses his own laser so that the phase noise between Alice's signal and Bob's LO is a rapidly varying process depending on the lasers linewidths. A particular challenge with a local LO is to create a reliable phase reference between the two parties. In an embodiment, the phase noise can be sufficiently corrected in order to minimize the induced excess noise. For example, this can be achieved by sampling the phase noise at the repetition rate and a possible solution is then to work at high repetition rates. The repetition rate of LLO-outband based CV-QKD is then a particular parameter. In such a design, the phase drift between the two lasers is advantageously corrected because it could result in a decorrelation of the relative phase between two consecutive pulses and prevent secret key generation. The signal phase correction algorithm is based on adjacent pulses phase measurements. This means that, even if a high rmax reduces the phase estimation variance of Eq. 9, there is a residual phase noise due to the time delay between phase estimation and phase correction. This remaining noise is the variance Vdrift of Eq. 8. It should be noted that the condition Vdrift«1 cannot be ensured in case of low repetition rates or large linewidth lasers. A high repetition rate allows sampling the phase noise faster than the phase noise drift and thus allows correcting it more efficiently. This imposes a minimum repetition rate for given lasers, in practice. The phase estimation scheme can require phase reference pulses as intense as possible in order to accurately measure the phase noise. However, the finite dynamics of the amplitude modulator limits the maximal amplitude allowed. This limitation can be modeled by considering a modulator excess noise contribution tout due to the truncation of the zero-mean modulation. In an embodiment, both the signal and the reference pulses are modulated using the same modulator. This means that there is a trade-off in terms of rmax between the errors on the modulated amplitude (from Eq. 6) which increases with the maximal amplitude rmax and the phase estimation scheme efficiency.

In an embodiment, there is disclosed a method of performing coherent optical communication of quantum information between an emitter (or sender) A and a distant receiver B connected by an optical channel (e.g. fiber optics), wherein emitter A comprises a laser LA and wherein receiver B comprises a laser LB used as a local local oscillator (LLO) to operate a coherent receiver, said method comprising the steps of at A, deriving phase-coherently, one or two optical pulses from a same optical wavefront produced by the laser LA at cycle i, said pulses being self-coherent with the laser LA; at A, encoding logical quantum information Q(i) and (as well as) physical phase reference information R(i) onto those one or two self-coherent optical pulses by using a coherent multiplexed encoding mechanism; sending multiplexed Q(i) and T(i) through the optical channel from A to B; at B, measuring logical quantum information Q(i) and physical phase reference information R(i) with a multiplexed coherent measurement with said one or two self-coherent pulses derived from a single optical wavefront produced by laser LB and used as local oscillators to perform a coherent detection, thereby obtaining or determining classical measurements Qm(i) of Q(i) and Rm(i) of R(i); at B, determining the relative phase Phi(i) at interference at cycle i between Q(i) optical pulse and corresponding LO pulse by estimating the relative phase between R(i) optical pulse and corresponding LO pulse; and at B, determining logical quantum information Q(i) by correcting Qm(i) measurement using relative phase Phi(i) estimation.

The method can be "computer-implemented": while some steps of the method do not require a computer (i.e. only optical signals are used), some steps of the method can use one or more computers (CPU, memory, I/O) or processors or processing means. Processors or processing means can be local (locally accessed) and/or distant (remotely-accessed). Processors for example can comprise ASICs or FPGAs or other types of circuits.

From the perspective of an emitter A, there is disclosed a method of performing coherent optical communication of quantum information with a distant receiver B connected to A by an optical channel, where the emitter A comprises a laser LA and where the receiver B comprises a laser LB used as a local local oscillator LLO to operate a coherent receiver. The method comprises the steps of:

at A, deriving phase-coherently one or two optical pulses from a same optical wavefront produced by the laser LA at cycle i, the pulses being self-coherent with the laser LA;

at A, encoding logical quantum information Qi and physical phase reference information Ri onto the one or two self-coherent optical pulses by using a coherent multiplexed encoding mechanism; and sending multiplexed Qi and Ri through the optical channel from A to B.

From the perspective of a receiver B, there is further disclosed a method of performing coherent optical communication of quantum information between a distant emitter A and the receiver B connected by an optical channel, where the emitter A comprises a laser LA and where the receiver B comprises a laser LB used as a local local oscillator LLO to operate a coherent receiver. The method comprises the steps of:

at B, measuring logical quantum information Qi and physical phase reference information Ri with a multiplexed coherent measurement with the one or two self-coherent pulses derived from a single optical wavefront produced by laser LB and used as local oscillator to perform a coherent detection, thereby obtaining classical measurements Qmi of Qi and Rmi of Ri;

at B, determining the relative phase Phii at interference at cycle i between Qi optical pulse and corresponding LO pulse by estimating the relative phase between Ri optical pulse and corresponding LO pulse, and at B, determining logical quantum information Qi by correcting Qmi measurement using relative phase Phii estimation.

Embodiments of the invention describe the communication of information from A to B. The roles of party A (herein described as phase reference/emitter) and of party B (herein described as slave/receiver) cannot be "reversed" (A does not have detectors).

In practice, to get bidirectional communication, the described methods and systems can be implemented twice, each for a directional communication (first from A to B and secondly from B to A, thereby cumulating hardware specifications at endpoints).

Noticeably, laser LB at B can be used both as a LLO at B and also to play the role of phase reference/emitter, for example to communicate with another slave/receiver C (or even for A itself, if A is equipped with the necessary hardware, in particular a coherent detector).

An optical process involving two optical pulses is said to be «coherent» when the phase relation between the pulses is stable over time (i.e. significantly stable, either perfectly or partially most of the time). Two optical pulses are said "coherent" if they are produced in such a way that the relative phase between them is known and stable.

As used herein, the expression "deriving phase coherently one or two optical pulses from the optical wavefront produced by laser LA at time Ti" means that light from the one or two pulses stems from the optical wavefront emitted by LA at time Ti, and that there is/are (a) fixed phase(s) between said pulses and between the phase of LA at time Ti. In case two pulses are derived, they are therefore phase coherent (by definition).

Coherent multiplexed encoding stems for a joint encoding of two types of information, such as quantum information Q(i) and phase reference information R(i) on one or two self-coherent optical pulses. The multiplexed encoding is said coherent as a stable phase relation exists between optical carriers encoding Q(i) and R(i), these optical carrier being moreover both coherent with laser LA at time Ti. If the relative phase between physical carriers of quantum information and phase reference information is known and constant, that relative phase remains both known and constant after coherent multiplexed encoding.

Coherent multiplexed detection mechanism stems for a joint phase-sensitive measurement of Q(i) and R(i) on the single (or the two) optical pulse(s) conveying Q(i) and R(i). LB is used as a local phase reference (LLO) in these phase-sensitive measurement, for example to perform homodyne or heterodyne detection.

The detection mechanism is said to be coherent if relative phase between LA at time T(i) and the phase of LB at the time of detection(s) is stable from one cycle i to another cycle i'.

An object of the information processing performed according to the invention is to determine or estimate the phase drift between LA at time Ti and LB at the time of detection(s). Based on this phase drift estimate DeltaPhi(i), a correction can be applied to the measured value Qm(i). For example, in case of a heterodyne detection being used at B to measure the quadrature of a coherent state Q(i), the value Qm (i) would consist in two real values, two quadrature values Xm(i) and Pm(i). The correction to be applied on Qm(i)=(Xm(i), Pm(i)) to retrieve a phase corrected estimate of Q(i) would then consists in a rotation of Qm(i) by an angle −DeltaPhi(i).

Correction of the Qm(i) measurement in order to get precise estimation of the emitted quantum information Q(i) using relative phase Phi(i) estimation is called phase correction. It can be done in practice either in a digital signal processing way, said method consisting in digitally correcting the measurement values using algorithm techniques, or in a physical way, said method consisting in physically correct the phase of the LO to phase-lock the relative phase.

In practice, Bob's receiver can be either a homodyne (measurement of one state quadrature) or a heterodyne (measurement of both quadratures) detection. In case of strong phase noise regime, heterodyne measurement is necessary to get the relative phase noise more precisely. In low phase noise regimes, homodyne detection can be sufficient.

A challenge of this type of design is to correct the arising phase drift of the two involved lasers. In practice, the relative phase has to be evaluated in order to ensure the coherence between emission and reception. This phase evaluation has to be done on specific physical phase information. This information can be called the phase reference. Due to phase drift, sequential signal and phase reference pulses generation would result in a minimal phase drift which can be large enough to prevent any secret key generation. Some embodiments of the invention allow to perform phase evaluation phase-coherently with the signal and, as such, no phase noise results from that phase evaluation.

An "LLO-displacement" embodiment or design is now described.

In a development, the method further comprises the steps of:

at A, deriving a single optical coherent state pulse Alpha (i) from the optical wavefront produced by LA at cycle i;

at A, encoding both phase reference information R(i) and quantum information Q(i) onto the quadratures of the pulse Alpha(i), this encoding being obtained by displacing coherently the quantum information Q(i) to encode the phase reference information R(i) as the displacement of the mean value of Q(i);

sending the coherent state Alpha(i) from A to B through the optical channel;

at B, measuring the two quadratures of the received pulse Alpha'(i) at reception time of cycle i where the laser LB is used as a local-local oscillator (LLO) to produce a coherent state pulse mode matched with the received pulse;

at B, determining the relative phase Phi(i) between LA and LB with the two quadratures, at B, determining quantum information Q(i) using relative phase estimation Phi(i) and the two quadrature measurement outcomes.

An embodiment is now described, using heterodyne detection. The quantum state description of the single optical pulse derived from LA on which Qi and Ri information is encoded can be described as a single mode bosonic coherent state or as a collection of a small number of single mode coherent states with almost identical quadrature values, and thus treated as a one single mode bosonic coherent state.

Quantum information designates classical variables encoded on the quadratures of the coherent state. A displacement is a shift in the mean quadratures values of those classical variables resulting in a shift in the mean value of the coherent state.

The two quadratures encoded on the coherent state leaving Alice can be denoted (Xi+ Delta, Pi), where Xi and Pi are quantum information quadratures expressed in the phase reference frame of LA at time Ti and where Delta is the displacement, in phase with laser LA at time Ti.

The expression «Large Delta» means that T*|Delta|>>max{Sqrt(Var(Xi)), N0} and T*|Delta|>>max{Sqrt(Var(Pi)), N0}, where N0 stands for the shot noise variance. This condition allows, using the quadratures measurement results to evaluate the phase drift between LA at time Ti and LB at the time of the dual homodyne measurement Ti' without being affected too much by the shot noise N0, nor by the noise due to the Qi modulation.

During a heterodyne measurement, both the LLO pulse and the signal pulse are split into two arms, with a 50/50 beamsplitter. This split leads to a 3 dB loss on the signal. In one arm, signal and LLO interfer on a balanced beamsplitter in order to measure one quadrature of the signal, via homodyne detection. In the other arm, the LLO is phase-shifted by 90° and the other quadrature of the signal is measured via homodyne detection.

In response to the estimation of the phase drift, a correction procedure subsequently allows estimating the quantum information Qi. The estimation procedure for Qi uses the fact that |Delta| the value of the displacement amplitude and T, the value of the channel transmission in intensity, are known by B.

A heterodyne detector is a phase-diversity homodyne detector. The detector comprises two homodyne detectors in which the phase of the two local oscillators has a relative phase of pi/2.

An embodiment comprising phase correction steps is now described.

In such embodiment, the method may comprise the step of correcting the relative phase by, at A, encoding quantum information and phase reference information on the same optical coherent state pulse Alpha(i). The phase reference information R(i) is encoded as the displaced mean value of quantum information Q(i). The method may further comprise:

sending the coherent state Alpha(i) from A to B through the optical channel;

at B, measuring the two quadratures of the received pulse Alpha(i) leading to classical measurement outcomes Xm(i) and Pm(i);

at B, computing an estimate Theta_est(i) of the relative phase by processing measurement results anterior to i, Xmj and Pmj, over windows of size W wherein 0≤i−j≤W; and, at B, correcting the relative phase drift on quantum information measurement outcomes Xm(i) and Pm(i) by applying phase correction rotation on the raw results based on the Theta_est(i) estimate and then by compensating the value of the displacement R(i).

The displacement of the coherent state is a displacement in the phase space. This represents a displacement of the mean value of each quadrature. This is an encoding of the phase reference of Alice which is known by Bob.

A "LLO-delayline-dsp" embodiment ("design") is now described.

In such embodiment, the method may comprise the steps of:

at A, deriving two different optical coherent state pulses QP(i) and RP(i), the two pulses being generated by splitting a single optical pulse produced by LA at cycle i into two pulses and by delaying the second pulse with respect to the first one;

at A, encoding quantum information Q(i) on the quadratures of the optical coherent state QP(i);

at A, encoding phase reference information R(i) on the optical coherent state RP(i), whose quadrature value in phase with LA is displaced by a large value Er coherently with LA; sending coherent states QP(i) and RP(i) from A to B through the optical channel;

(at B) deriving two phase-coherent local-local oscillator pulses LLOQ(i) and LLOR(i), said pulses being generated by splitting a single optical pulse produced by LB at cycle i into two pulses and by delaying the second pulse with respect to the first one;

at B, measuring the two quadratures of the received reference pulse RP(i) with a coherent detection where the optical pulse LLOR(i) is used as a local-local oscillator (LLO) mode-matched with RP(i), obtaining measurement outcomes (Xref(i),Pref(i));

at B, determining the relative phase drift Theta_est(i) between LA and LB with the quadrature measurement outcomes (Xref(i),Pref(i));

at B, measuring quantum information Q(i) on the received pulse QP(i) with a coherent detection at cycle i, wherein the optical pulse LLOQ(i) is used as local-local oscillator (LLO) mode-matched with QP(i), obtaining classical information Qm(i);

at B, correcting Qm(i) with phase correction processing using Theta_est(i) and determining logical quantum information Q(i).

At emission, the laser LA outputs successive optical coherent pulses (either using ON/OFF mode or amplitude modulator pulse shaping the continuous-wave output of the laser). Each pulse is split into two parts using an unbalanced beamsplitter. The reference part is more intense than the quantum part.

The reference pulse path is delayed using a delay line which is an additional optical fiber increasing the optical path of the phase reference pulse. The delay time is set to be half the time between two source pulses for practical facility at reception resulting in multiplying the repetition rate by a factor 2.

Reference pulses are used to estimate the relative phase between LA and LB. As corresponding quantum information and phase reference pulses are phase-coherent by construction, the estimation of the relative phase at the phase reference interference is a good approximation of the relative phase at quantum pulse measurement.

In this embodiment, the quantum information Q(i) can be estimated using homodyne detection because the phase coherence is physically ensured at interference. The reference pulse however needs a heterodyne to allow phase correction even in high phase noise regime.

A "LLO-delayline-opll" embodiment ("design") is now described.

In such an embodiment, the method may comprise the steps of:

at A, deriving two different optical coherent state pulses QP(i) and RP(i), the two pulses being generated by splitting a single optical pulse produced by LA at cycle i into two pulses and by delaying the second pulse with respect to the first one;

at A, encoding quantum information Q(i) on the quadratures of the optical coherent state QP(i);

at A, encoding phase reference information R(i) on the optical coherent state RP(i), whose quadrature value in phase with LA is displaced by a large value Er coherently with LA; sending coherent states QP(i) and RP(i) from A to B through the optical channel;

at B, deriving two phase-coherent local-local oscillator pulses LLOQ(i) and LLOR(i), said pulses being generated by splitting a single optical pulse produced by LB at cycle i into two pulses and by delaying the second pulse with respect to the first one;

at B, demultiplexing or separating QP(i) and RP(i) onto two different optical paths; at B, measuring the two quadratures of the received reference pulse RP(i) with a coherent detection, where the LLOR(i) pulses is used as a local-local oscillator (LLO) mode-matched with RP(i) obtaining measurement outcomes (Xref(i),Pref(i));

at B, determining the relative phase drift Theta_est(i) between LA and LB with the quadrature measurement outcomes (Xref(i),Pref(i));

at B, physically loop-locking the phase of the LLOQ(i) pulse with the phase of the optical reference pulses RP(i) with a feedback mechanism and the Theta_est(i) estimate;

at B, measuring the received pulse QP(i) with a coherent detection wherein the phase-locked LLOQ(i) pulses is used as a local-local oscillator (LLO) mode-matched with RP(i); and, at B, determining the quantum information Q(i).

At emission, the laser LA outputs successive optical coherent pulses (either using ON/OFF mode or amplitude modulator pulse shaping the continuous-wave output of the laser). Each pulse is split in two parts using an unbalanced beamsplitter. The reference part is more intense than the quantum part.

The reference pulse path is delayed using a delay line which is an additional optical fiber increasing the optical path of the phase reference pulse. The delay time is set to be half the time between two source pulses for practical facility at reception resulting in multiplying the repetition rate by a factor 2.

The multiplexing techniques have to allow Bob to separate phase reference pulses and quantum signal pulses in order to measuring them with different coherent detectors. In practice, this can be done using polarization techniques. A polarization beamsplitter can split the source pulses at emission while another polarization beamsplitter splits phase reference pulses and quantum signal pulses onto two different optical paths at Bob side.

Reference pulses are used to estimate the relative phase between LA and LB. As corresponding quantum information and phase reference pulses are phase-coherent by construction, the estimation of the relative phase at the phase reference interference is a good approximation of the relative phase at quantum pulse measurement.

The relative phase estimation is then used to physically control the phase of the local oscillator of the quantum signal measurement in order to ensure the coherence at interference. Different mechanisms can be used to realize an OPLL, such as injection, dither-loop, balanced loop, Costas loops.

The phase-locking process can comprise a technique to feedback control (at least) the repetition rate of the experiment the phase of the local oscillator pulse.

There is further disclosed a computer program product comprising instructions which when executed on a computer cause said computer to perform one or more steps of the method.

There is also provided a system comprising means to perform one or more steps of the method.

In some embodiments, there is disclosed a system for coherent optical communication of quantum information between an emitter A and a distant receiver B connected by an optical channel. The emitter A comprises a laser LA and the receiver B comprises a laser LB used as a local local oscillator LLO to operate a coherent receiver, the system further comprising:

at A, a laser LA configured to derive phase-coherently one or two optical pulses from a same optical wavefront at cycle i, the pulses being self-coherent with the laser LA;

at A, a coherent multiplexed encoder to encode logical quantum information Q(i) and physical phase reference information R(i) onto those one or two self-coherent optical pulses;

an optical channel from A to B configured to send multiplexed Q(i) and T(i);

at B, a multiplexed coherent measurement device configured to measure logical quantum information Q(i) and physical phase reference information R(i) with said one or two self-coherent pulses derived from a single optical wavefront produced by laser LB and used as local oscillators to perform a coherent detection, thereby obtaining classical measurements Qm(i) of Q(i) and Rm(i) of R(i);

at B, a device configured to determine the relative phase Phi(i) at interference at cycle i between Q(i) optical pulse and corresponding LO pulse by estimating the relative phase between R(i) optical pulse and corresponding LO pulse;

at B, a device configured to determine logical quantum information Q(i) by correcting Qm(i) measurement using relative phase Phi(i) estimation.

From the perspective of an emitter A, there is disclosed a system for coherent optical communication of quantum information between the emitter A and a distant receiver B connected by an optical channel, where emitter A comprises a laser LA and where receiver B comprises a laser LB used as a local local oscillator LLO to operate a coherent receiver. The system further comprises:

at A, a laser LA configured to derive phase-coherently one or two optical pulses from a same optical wavefront at cycle i, said pulses being self-coherent with the laser LA;

at A, a coherent multiplexed encoder to encode logical quantum information Qi and physical phase reference information Ri onto those one or two self-coherent optical pulses;

an optical channel from A to B configured to send multiplexed Qi and Ti.

From the perspective of a receiver B, there is disclosed a system for coherent optical communication of quantum information between an emitter A and the distant receiver B connected by an optical channel, the emitter A comprises a laser LA and the receiver B comprises a laser LB used as a local local oscillator LLO to operate a coherent receiver. The system further comprises:

at B, a multiplexed coherent measurement device configured to measure logical quantum information Qi and physical phase reference information Ri with said one or two self-coherent pulses derived from a single optical wavefront produced by laser LB and used as local oscillators to perform a coherent detection, thereby obtaining classical measurements Qmi of Qi and Rmi of Ri;

at B, a device configured to determine the relative phase Phii at interference at cycle i between Qi optical pulse and corresponding LO pulse by estimating the relative phase between R(i) optical pulse and corresponding LO pulse; and at B, a device configured to determine logical quantum information Qi by correcting Qmi measurement using relative phase Phii estimation.

A specific embodiment of the system (with displacement multiplexing) is now described.

In such an embodiment, the system may further comprise a heterodyne detector and a local-local oscillator (LLO). The information sent from A to B is encoded on a single optical coherent state pulse, derived from the optical wavefront produced by LA at cycle i; quantum information Q(i) is encoded on both quadratures of the coherent state while phase reference information R(i) is encoded as a displacement of amplitude Delta of the quadrature in phase with LA at cycle i; a heterodyne detector measures both two quadratures of the received pulse at cycle i. The laser LB is used as a local-local oscillator (LLO) to produce a coherent state pulse mode matched with the received pulse. The quadrature measurement results are used to estimate the phase drift between LA and LB, and then to determine the quantum information Q(i).

A specific embodiment of the system (with delay line and DSP phase correction) is now described.

In this embodiment, the system may further comprise a splitter, an optical delay line and a homodyne or heterodyne detector where quantum information Q(i) and phase reference information R(i) are encoded onto two different optical coherent state pulses. These two pulses are generated by splitting onto a beamsplitter an optical pulse produced by LA (at cycle i) and by delaying the second pulse by a time DeltaT with respect to the first one, with an optical delay line. Quantum information Q(i) is encoded on the quadratures of one of the pulses QP(i). Phase reference information R(i) is encoded on the second pulse RP(i) whose quadrature value is in phase with LA and displaced by a value Delta, while its other quadrature value is not modulated; a measurement DQ of the quadratures of the received pulse QP(i) is performed at a homodyne or heterodyne detector at Bob at cycle i, with LB used as local-local oscillator (LLO) to produce a coherent state pulse LLOQ(i) mode-matched with QP(i); a heterodyne measurement DR of the two quadratures of the received reference pulse RP(i) is performed at Bob at cycle i. The laser LB is used as local local oscillator (LLO) to produce a coherent state pulse LLOR(i) that is obtained by delaying using a delayline a part of the wavefront used to produced LLOQ(i) by at cycle i with a delay line; the quadrature measurement results obtained with DR are used to determine the phase drift Phi(i) between LA and LB. The determined phase drift is then used to correct the quadrature measurement results of QP(i) and to determine the quantum information Qi.

A specific embodiment of the system (with different detectors) is now described. In a development, the coherent detector DQ or the coherent detector DR are different single detectors. Advantageously, using two different detectors removes the constraint on detection dynamics if it can imply higher hardware costs and experimental complexity.

In a development, the coherent detector DQ and the coherent detector DR are the same coherent detector. Having one single detector presents the advantage of design simplicity, lower hardware cost. On the other hand, it can be challenging, due to the finite dynamics of the detection (before saturation) to detect (weak) quantum signal Qi and (strong) reference signal Ri with the same detection without suffering from saturation.

In a development, the coherent detector DQ OR the coherent detector DR is associated with an intensity of the coherent state pulse LLOR which is decreased with respect to the intensity of the coherent state pulse LLOQ.

Alternatively, the constraint on dynamics can be addressed by lowering the local oscillator power when detecting (intense) reference pulse PR. Power levels have to be very carefully calibrated and power stability will introduce a new experimental issue in this design. Moreover, lowering local oscillator power will have the detrimental effect of increasing the relative effect of electronic noise, although such effect should not be too detrimental if the reference pulse power is very high compared to shot noise.

A specific embodiment of the system ("LLO-self coherent-opll" design) is now described.

In a development, quantum information Q(i) and phase reference information R(i) are encoded onto two different optical coherent state pulses, both pulses being coherently derived from the optical wavefront produced by LA at cycle i, the second pulse being delayed with respect to the first one, with an optical delay line; quantum information Q(i) is encoded on the quadratures of one of the pulses, called QP(i); phase reference information R(i) is encoded on the second pulse, called RP(i), whose quadrature value in phase with LA is displace by a large value, Delta, while its other quadrature value is not modulated; the phase reference pulse RP(i) is used to operate an optical phase lock-loop at B (OPLL), locking the phase of laser LB to the phase of optical reference pulses RP(i) with feedback mechanisms; and a dual-homodyne measurement DQ of the quadratures of the received pulse QP(i) is performed at B at cycle i, with LB used as local local oscillator (LLO) to produce a coherent state pulse PLLOQ mode-matched with QP(i).

Advantageously, different mechanisms can be used to realize an OPLL, such as one or more of an injection, dither-loop, balanced loop or Costas loop.

It should be noted that the following parameters represented in the exemplary figures are substantially constant: Alice's modulation variance is VA=2; the reconciliation efficiency is β=0.95; the homodyne efficiency is η=0.7, and the electronic noise is velec=0.1 for 10^8 photons in the LO pulses at interference.

A 8 bits precision phase modulator and a 40 dB dynamics (ε=0.01) in the Mach-Zender amplitude modulator are further considered.

FIG. 1 shows an embodiment of Bob's receiver 100 in the TLO design. Bob receives both attenuated signal and LO multiplexed pulses. He first has to demultiplex 110 the two pulses. Then, he randomly chooses the quadrature to measure as a random phase in $\{0, \pi/2\}$ to apply to the LO with the phase modulator 120. Finally, the signal and LO interfer on a 50/50 beamsplitter 130. Bob's measurement corresponds to the difference of the photocurrents in output of the beamsplitter.

Figure 2:
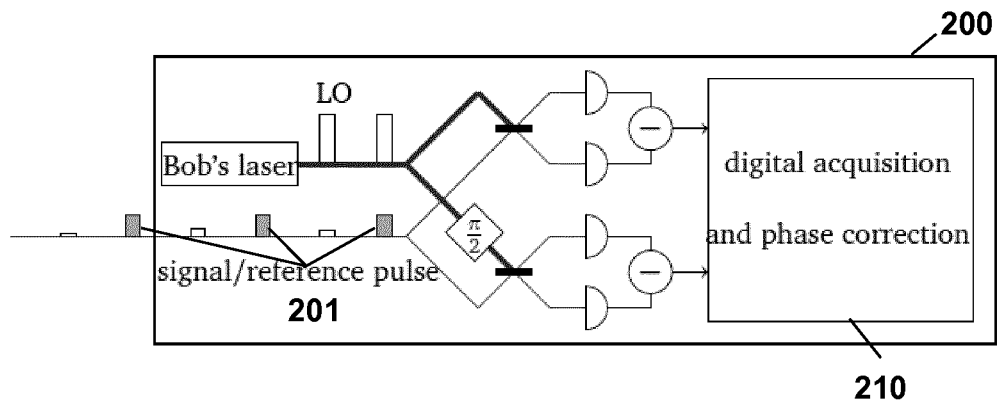
FIG. 2 shows an embodiment of Bob's receiver in the LLO-sequential design.

FIG. 2 shows an embodiment of Bob's receiver in the LLO-sequential design. Bob alternatively receives signal and phase reference pulses 201. He performs heterodyne detection on each one of the pulse and gets both X and P quadratures. The phase correction 210 is then performed using digital processing.

Figure 3:
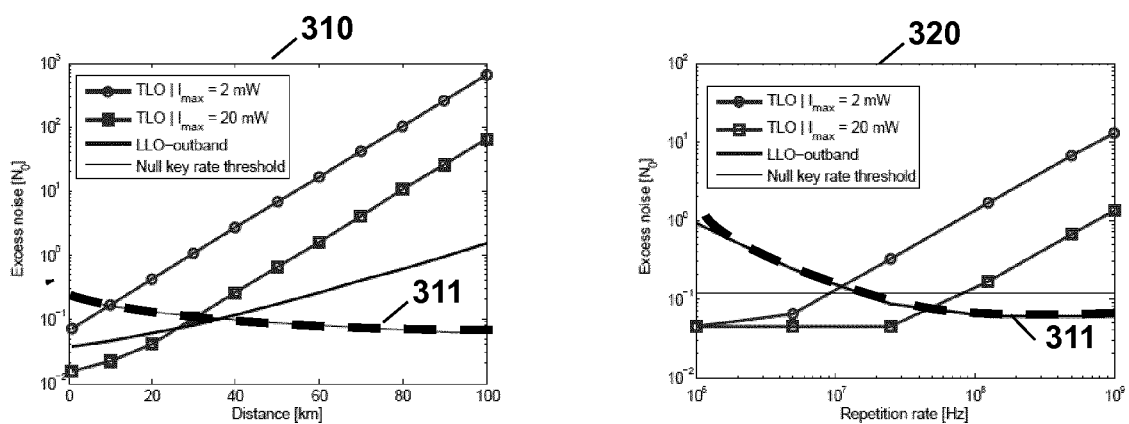
FIG. 3 compares the theoretical excess noise of the transmitted-LO and the local-LO designs regarding distance and repetition rate.

FIG. 3 compares the theoretical excess noise of the two designs (transmitted-LO and the local-LO designs) regarding distance 310 and repetition rate 320. The figure shows the comparison between theoretical key rates in the transmitted-LO and the local-LO designs for by δν=50 kHz. The electronic noise is considered as totally trusted (optimistic model). The left graph 310 represents the excess noise as function of the distance, for a repetition rate f=50 MHz. The right graph 320 represents the excess noise as function of the repetition rate for d=25 km. Different values Imax have been chosen for the transmitted LO design. The dashed lines 311 correspond to the null key rate threshold ξNKR.

It is assumed that Alice's laser launch power is limited to Imax by experimental reasons. Standard implementations of the transmitted LO design generally rely on few milliwatts input intensities. For theses curves, it has been chosen that Imax ∈ {2 mW, 10 mW, 20 mW}. It can be seen that, depending on the value of Imax, there are distance and repetition rate limits from which the excess noise increases above the null key rate threshold. This is due to the fact that Alice cannot ensure a bright enough LO at Bob's side (~$10^8$ photons per pulses) and then the electronic to shot noise ratio prevents to generate a secret key. From the right FIG. 320, it can be seen that for high repetition rates, the LLO-displacement design allows to generate a secret key. This is due to two reasons: first, as discussed, the LO intensity at Bob's side does not depend on the repetition rate and thus the electronic to shot noise ratio is locally controlled while it is not the case for the TLO design. Second, high repetition rates allow to efficiently correct the phase drift and to ensure a low phase noise induced excess noise. Finally, in order to maintain a low electronic to shot noise ratio and a low phase noise, high repetition rates as well as long distances CV-QKD should be based on local LO.

Embodiments of the invention are now described.

Three LLO designs according to embodiments of the invention are now described. These designs comprise self-coherent signal/phase reference pairs.

In an embodiment, a way to locally generate the LO is to ensure that the signal and the phase reference does not suffer from any phase noise and come from the same pulse at emission. Three designs or embodiments implementing this approach are now described:

In an embodiment, the system according to the invention comprises coherent signal/reference pulses pairs, with a digital phase correction.

As discussed, the LLO-sequential design is not limited by the laser phase drift between two adjacent pulses. In this design, both phase estimation and phase correction are performed on pulses split from the very same pulse. Doing this, the minimal remaining phase noise due to laser phase drift from the LLO-sequential design can be removed.

In an embodiment ("LLO-delayline-dsp design"), Alice produces a 2/f repetition rate signal with her laser. She then splits each pulse into two parts using an unbalanced beamsplitter. The weak part is modulated to get the usual GMCS signal coherent state while the strong one is delayed of 1/f seconds. The two pulses are finally sent through the quantum channel. Finally, Alice sends consecutive pairs of one signal pulse and one reference pulse both output of the same original pulse. This can be seen as a time multiplexing method to transmit both a signal and a perfectly phase-locked phase reference independent of the laser drift. At Bob's side, a local LO is used to measure each pulse. Both the relative phase estimation and correction are performed digitally. The phase correction is no longer limited by the phase drift between two adjacent pulses but only by the precision of the phase estimation efficiency on the reference pulse.

As discussed, the remaining phase noise depends on the efficiency of the phase estimation on reference pulses. This depends on the available intensity on each pulse. This efficiency can be expressed as the variance of the phase estimation. It is limited by Alice's laser intensity, the intensity allowed on the quantum channel and by the dynamics of Bob's homodyne detector.

In an embodiment ("LLO-delayline-opll"), the system according to the invention comprises coherent signal/reference pulses pairs with optical PLL. In such an embodiment, there is introduced another LLO-delayline design in which the phase correction is performed optically. Alice produces the same pulses as in the design LLO-delayline-DSP design. Bob makes the reference pulses interfer with his own LO oscillator and measures the intensity of the outcoming beam. Using this intensity, he can estimate the relative phase and correct it on the signal homodyne detection LO. Doing this, the phase correction is then performed physically.

Figure 4:
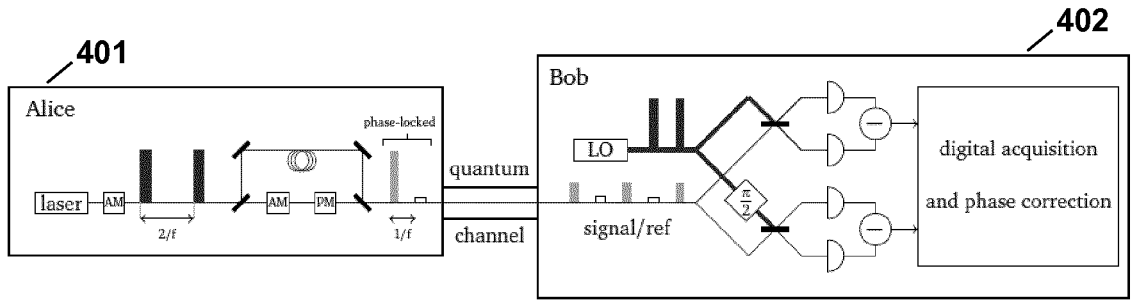
FIG. 4 illustrates an embodiment of the invention according to the "LLO-delayline-dsp" design.

FIG. 4 illustrates an embodiment of the invention (according to the "LLO-delayline-dsp" design). Alice 401 produces pulses at a repetition rate of f/2. She splits each pulse into a signal pulse and a reference pulse. As output of the same beam, both pulses are phase-locked. Using a delay line, Alice delays the reference pulse of 1/f s. She then produces a 1/f rate signal. At reception, Bob 402 measures each pulse using his own LO. Doing this, the phase estimation is performed on a pulse which is phase-locked with the signal pulse.

Figure 5:
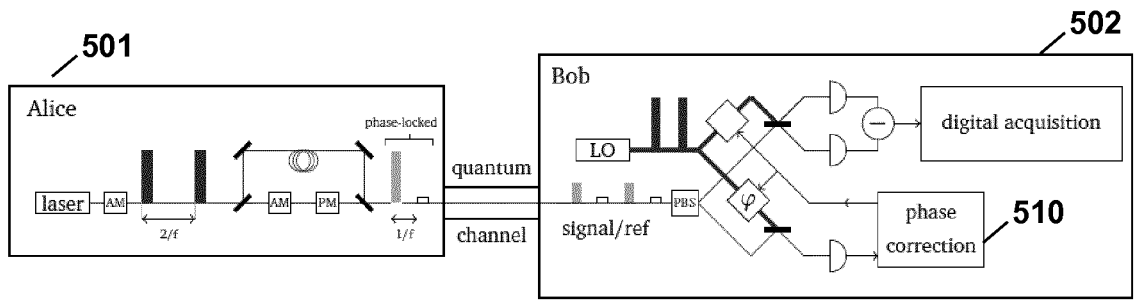
FIG. 5 illustrates an embodiment of the invention according to the "LLO-delayline-opll" design.

FIG. 5 illustrates an embodiment of the invention (according to the "LLO-delayline-opll" design). Alice 501 produces pulses at a repetition rate of f/2. She splits each pulse into a signal pulse and a reference pulse. As output of the same beam, both pulses are phase-locked. Using a delay line, Alice 501 delays the reference pulse of 1/f s. She then produces a 1/f rate signal. At reception, Bob 502 separates signal and reference pulses on a polarization beamsplitter. He uses the reference pulses to estimate the relative phase and physically correct 510 that estimation to control the phase of LO on the signal homodyne detection.

Figure 6:
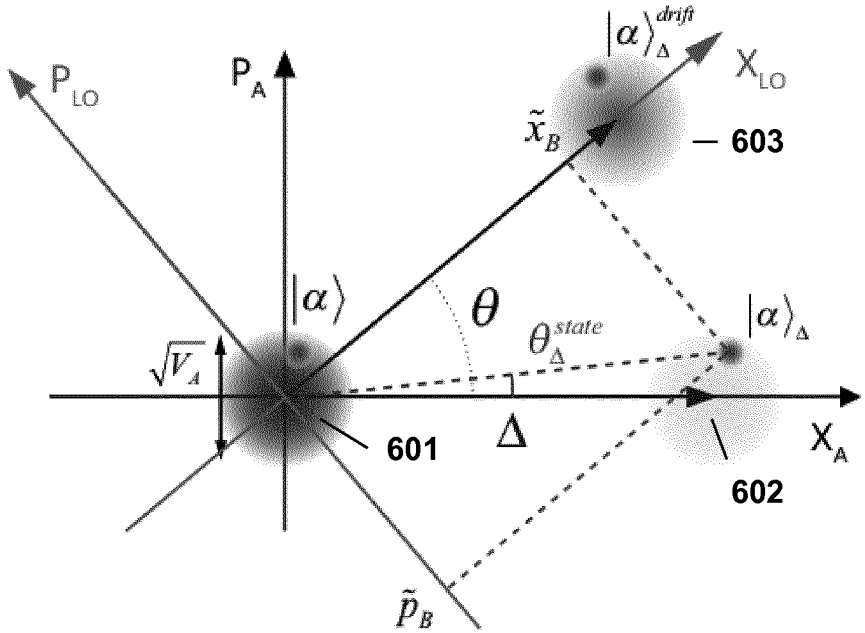
FIG. 6 shows an embodiment of the invention, using inband phase reference transmission.

FIG. 6 shows an embodiment of the invention, using inband phase reference transmission. In such an embodiment, a modified LLO method lifts the discussed limitations due to the delay in phase estimation process of the LLO-sequential design. The FIG. 6 shows that the thermal state sent by Alice is displaced. Alice sends the displaced coherent state $|xA+\Delta^* \cos \varphi\Delta, pA+\Delta^*\sin\varphi\Delta\rangle$, with xA and pA her Gaussian variables. Without loss of generality, $\varphi\Delta$ can be set to 0. The value of the displacement is known and fixed in Alice's phase space so that it carries information on her phase reference. Every pulse can then be used both as signal as well as reference pulse. Using a heterodyne detection, Bob measures both X and P quadratures of each received coherent state and get values (xB,pB). Due to phase drift, the phase of each coherent state in Bob's reference can be written as $\theta=\theta state+\theta drift$ where $xA+i.pA=r^*\exp(i^*\theta state)$ and $\theta drift$ is the relative phase between Alice's and Bob's lasers at interference, as shown FIG. 6. Using xB and pB, Bob can estimate the overall relative phase as equation 1 of Exhibit 1 which is an estimation of $\theta$. However, providing a large displacement $\Delta$ compared to sqrt(VA+1), the value and the variance of the phase $\theta$state are small so that $\theta$ is a good approximation of the relative phase $\theta$drift. Finally, the knowledge of Adrift can be expressed given the estimation $\theta$ as the variance of $\theta$state which is equation 2 of Exhibit 1 Thus, providing a strong enough $\Delta$, the value $\theta$ is a precise estimation of the relative phase $\theta$drift. It is emphasized that the remaining phase noise is then, at most, the variance VM of the single measurement based phase estimation. In particular, it does no longer depend on the phase drift between two consecutives pulses. After the phase estimation process, Bob can finally correct his measurements, by rotation of angle $-\theta$. Mainly, Bob estimate Alice's quadratures with the following (xB, pB): equation 3 of Exhibit 1, where $R\theta$ (P) is a rotation of the point P of angle $\theta$. This embodiment is referred to as the "LLO-displacement" design, which is described FIG. 7.

FIG. 6 shows a phase space representation of Alice's thermal state. The centered circle 601 represents the zero-mean variance $V_A$ modulation of both TLO and LLO-sequential designs signal. The circle 602 represents the displaced modulation in the LLO-inband design referred to Alice's phase reference. The displacement A corresponds to the phase reference. The circle 603 is Alice's modulation from Bob's point of view. Due to phase noise, Alice's thermal state is rotated by a random phase Adrift. In the regime where $\Delta\gg pVA$, the phase $\theta$state is close to 0 which allows Bob to efficiently estimate the phase drift Adrift. This scheme is valid for G=1. By providing a large $\Delta$, Bob has a precise estimation of the relative phase using single state quadratures measurements. However, using the Gaussian phase noise structure, the efficiency of the phase estimation process can be optimized by using adjacent phase estimations. Typically, phase time correlations can be used in filtering techniques. The Gaussian structure of phase noise can be expressed as equation 4 of Exhibit 1, where $\delta\theta i\sim N(0,Vdrift)$ where Vdrift is defined in equation 8 of Exhibit 1. Finally, the optimal phase estimation variance V opt can be written as equation 5 of Exhibit 1, where nopt is the optimal number of adjacent phase estimations $\varphi$ j used in the phase evaluation process and can be written as equation 6 of Exhibit 1.

For example, in case of low phase noise regime i.e. where Vdrift$\ll$1, adjacent estimations can be averaged to increase the overall phase estimation efficiency. However, in a very fast phase noise regime where Vdrift>>VM, Eq. 6 leads to nopt=0 and the phase estimation process efficiency is directly the single measurement based efficiency VM. In particular, this means that even in case of strong phase noise, the relative phase can be recovered with precision at least VM using the displacement Δ.

The excess noise due to the phase noise can be written as equation 7 of Exhibit 1.

This quantity always decreases when the displacement increases. This means that the phase recovery process requires a displacement as large as possible. However, only a perfect displacement has been considered so far. A trade-off can be made between the phase estimation process and an eventual residual error in case of imperfect displacement due to imperfect amplitude modulators.

A limit on the displacement is due to the finite dynamics of the amplitude modulators. If the value Δ+sqrt(VA) is too close to the maximal amplitude, a large part of the modulation is truncated and the excess noise increases. However, unlike in the TLO and LLO-sequential designs, Alice's thermal state is not a zero-mean state. This means that the LLO-displacement design can tolerate a higher ηmin than the LLO-sequential design. The induced noise is noted ξ(Δ)mod. The error induced by the discretization of the phase modulator input voltage is proportional to the amplitude of the state modulated and results in a trade-off on the optimal displacement between phase estimation and the error on the amplitude.

Figure 7:
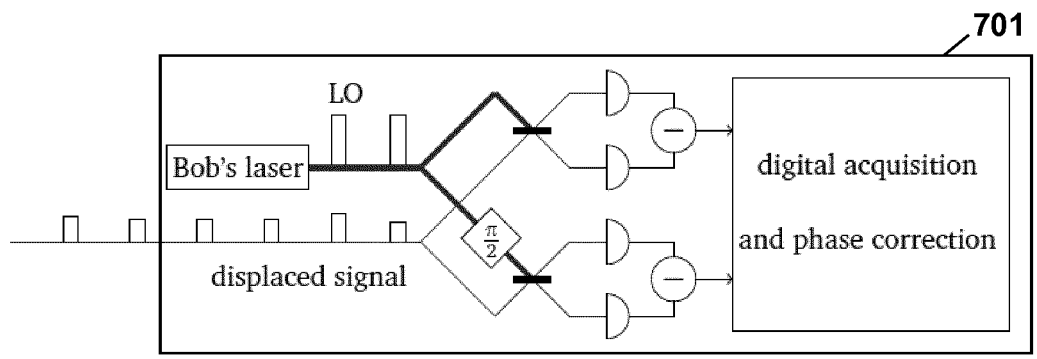
FIG. 7 shows an embodiment of Bob's receiver according to the "LLO-displacement" design.

FIG. 7 shows Bob's receiver 701 in an embodiment of the invention ("LLO-displacement" design). Bob performs heterodyne detection on each one of the pulses and performs digital phase correction. Each time slot in the signal band is used to perform CV-QKD. No pulse is dedicated for phase reference.

The total noise on Bob's estimation of Alice's quadrature can be expressed as equation 8 of Exhibit 1.

Systematic phase noise estimations in particular allow the LLO-displacement embodiment to be used in very fast phase noise regimes. Unlike in the LLO-sequential design in which the phase noise is estimated from adjacent pulses, the phase noise is now estimated using a filtering of consecutive estimations including the current one. This implies that, even if the relative phase is totally decorrelated from a pulse to the following one (very fast drift due to defective lasers or due to low repetition rates for instance), Bob can still get information on the phase noise and correct his measurements. In particular, this design would allow to perform CV-QKD in the regime of large phase noise which cannot be achieved using the LLO-out design. Furthermore, it is emphasized that using an inband reference phase transmission enables to use all the repetition rate for the signal. Another important advantage of this design is that the phase reference does not need multiplexing techniques which simplifies the experimental circuit of such a protocol.

Figure 8:
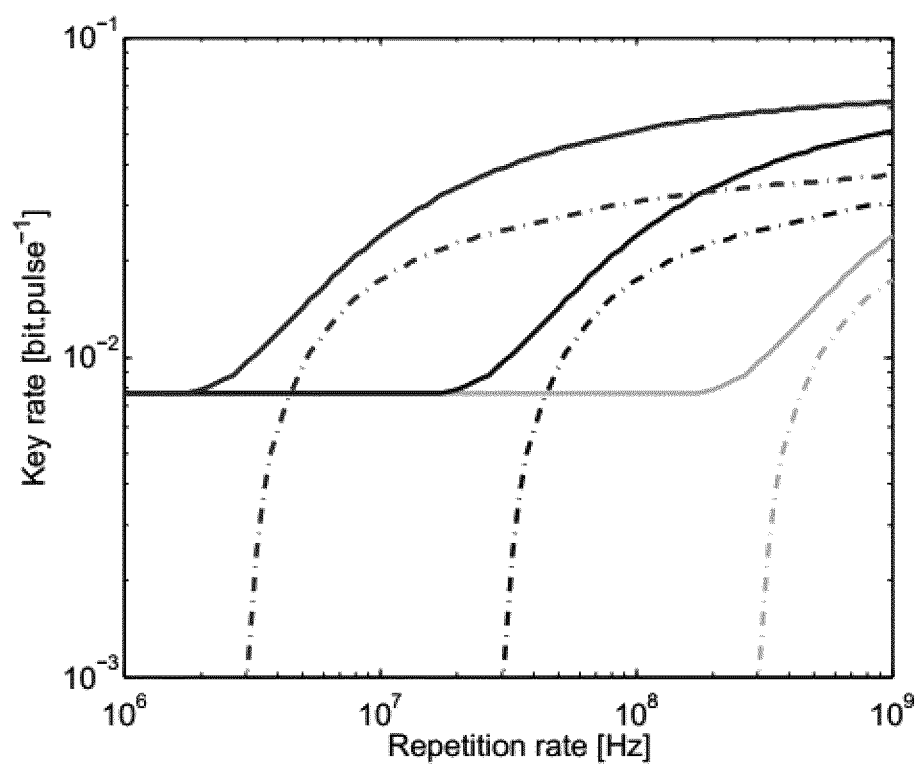
FIG. 8 shows a comparison of expected key rates in the LLO-sequential and LLO-displacement designs as a function of the repetition rate.

FIG. 8 shows a comparison of expected key rates of the LLO-sequential and LLO-displacement designs as function of the repetition rate f. (for 1 MHz, 50 kHz and 5 kHz). The dashed curves correspond to the LLO-sequential. It represents the key rate as a function of the repetition rate for different lasers linewidths. In high phase noise regimes (low repetition rates), the LLO-sequential (dashed curves) cannot produce secret key because the relative phase estimation efficiency is dominated by the noise Vdrift from Eq. 11. However, when the repetition rate is high enough, the drift Vdrift is small and phase correction is efficient. In contrast, in the LLO-displacement design, the phase noise can always be corrected due to systematic phase estimations. In low repetition rate regimes, the optimal phase estimation variance is the single-measurement based estimation while it can even be improved using the filtering technique in high repetition rates regimes. In low phase noise regimes, the phase noise is efficiently corrected in both designs and the gap between the curves come from the factor 1/2 which is saved in the LLO-displacement design due to simultaneous signal and phase reference transmission.

Figure 9:
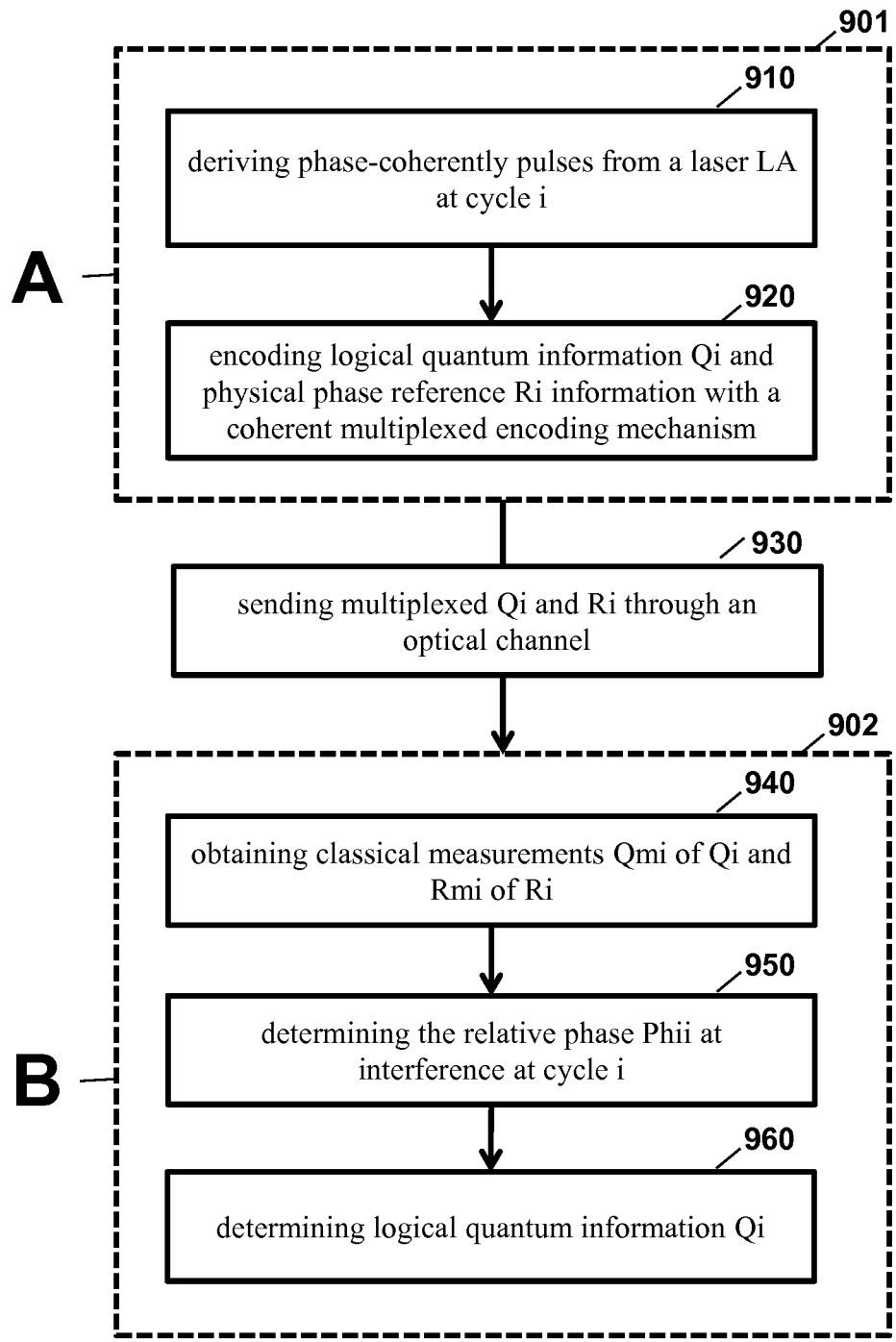
FIG. 9 shows examples of steps according to an embodiment of the invention.

FIG. 9 shows examples of steps according to an embodiment of the invention. In an embodiment, there is disclosed a method of performing coherent optical communication of quantum information between an emitter (or sender) A 901 and a distant receiver B 902 connected by an optical channel (e.g. fiber optics). Emitter A 901 comprises a laser LA and receiver B 902 comprises a laser LB used as a local local oscillator (LLO) to operate a coherent receiver. The method comprises the steps of:

at A, deriving phase-coherently 910, one or two optical pulses from a same optical wavefront produced by the laser LA at cycle i, the pulses being self-coherent with the laser LA;

at A, encoding 920 logical quantum information Q(i) and (as well as) physical phase reference information R(i) onto those one or two self-coherent optical pulses by using a coherent multiplexed encoding mechanism;

sending 930 multiplexed Q(i) and T(i) through the optical channel from A to B;

at B, measuring logical quantum information Q(i) and physical phase reference information R(i) with a multiplexed coherent measurement with said one or two self-coherent pulses derived from a single optical wavefront produced by laser LB and used as local oscillators to perform a coherent detection, thereby obtaining or determining 940 classical measurements Qm(i) of Q(i) and Rm(i) of R(i);

at B, determining 950 the relative phase Phi(i) at interference at cycle i between Q(i) optical pulse and corresponding LO pulse by estimating the relative phase between R(i) optical pulse and corresponding LO pulse; and at B, 960 determining logical quantum information Q(i) by correcting Qm(i) measurement using relative phase Phi(i) estimation.

The disclosed embodiments can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic or semiconductor system (or apparatus or device) or a propagation medium.

EXHIBIT 1

$$\bar{\theta} = \tan^{-1}\left(\frac{\bar{p}_B}{\bar{x}_B}\right)$$

EQUATION 1

-continued $$V_M = \text{var}(\theta_{state}) = \frac{GV_A + 1}{G\Delta^2} \quad \text{EQUATION 2}$$

$$(x_B, p_B) = R_{-\bar{\theta}}(\tilde{x}_B, \tilde{p}_B) - (\Delta, 0) \quad \text{EQUATION 3}$$

$$\theta_{i+1} = \theta_i + \delta\theta_i \quad \text{EQUATION 4}$$

$$V_\theta^{opt} = \frac{V_M}{n_{opt} + 1} + \frac{V_{drift}}{6} \cdot \frac{n_{opt}(2n_{opt} + 1)}{n_{opt} + 1} \quad \text{EQUATION 5}$$

$$n_{opt} = \left\lfloor \frac{\sqrt{V_{drift} + 6V_M}}{\sqrt{2V_{drift}}} \right\rfloor \quad \text{EQUATION 6}$$

$$\xi_{phase}^{inb} = GV_A \cdot \left(1 - e^{-V_\theta^{opt}}\right) + G\Delta^2 \cdot \left[\frac{1}{2} + \frac{1}{2}e^{-2V_\theta^{opt}} - e^{-V_\theta^{opt}}\right] \quad \text{EQUATION 7}$$

$$\chi_{LLO-out} = \frac{2-G}{G} + \frac{V_{elec}}{G} + \xi_{mod}^{(\Delta)} + \xi_{phase}^{inb} \quad \text{EQUATION 8}$$

The invention claimed is:

1. A method of performing coherent optical communication of quantum information between an emitter A and a distant receiver B connected by an optical channel, wherein emitter A comprises a laser LA and wherein receiver B comprises a laser LB used as a local local oscillator LLO to operate a coherent receiver, said method comprising the steps of:
at A, deriving phase-coherently one or two optical pulses from a same optical wavefront produced by the laser LA at cycle i, said pulses being self-coherent with the laser LA;
at A, encoding logical quantum information Q(i) and physical phase reference information Ri onto said one or two self-coherent optical pulses by using a coherent multiplexed encoding mechanism; sending multiplexed Q(i) and R(i) through the optical channel from A to B;
at B, measuring logical quantum information Q(i) and physical phase reference information Ri with a multiplexed coherent measurement with said one or two self-coherent pulses derived from a single optical wavefront produced by laser LB and used as local oscillators to perform a coherent detection, thereby obtaining classical measurements Qm(i) of Qi and Rm(i) of R(i);
at B, determining a relative phase Phi(i) at interference at cycle i between Q(i) optical pulse and corresponding LO pulse by estimating a relative phase between R(i) optical pulse and corresponding LO pulse,
at B, determining logical quantum information Q(i) by correcting Qm(i) measurement using relative phase Phi(i) estimation.

2. The method of claim 1, comprising the steps of:
at A, deriving a single optical coherent state pulse Alpha (i) from the optical wavefront produced by LA at cycle i;
at A, encoding both phase reference information R(i) and quantum information Q(i) onto the quadratures of the pulse Alpha(i), said encoding being obtained by displacing coherently the quantum information Q(i) to encode the phase reference information R(i) as the displacement of the mean value of Q(i); sending the coherent state Alpha(i) from A to B through the optical channel;
at B, measuring the two quadratures of the received pulse Alpha(i) at reception time of cycle i wherein the laser LB is used as a local-local oscillator LLO to produce a coherent state pulse mode matched with the received pulse;
at B, determining the relative phase Phi(i) between LA and LB with said two quadratures;
at B, determining quantum information Q(i) using relative phase estimation Phi(i) and the two quadrature measurement outcomes.

3. The method of claim 2, further comprising the step of correcting the relative phase by performing the steps of:
at A, encoding quantum information and phase reference information on the same optical coherent state pulse Alpha(i) wherein the phase reference information R(i) is encoded as the displaced mean value of quantum information Q(i);
sending the coherent state Alpha(i) from A to B through the optical channel;
at B, measuring the two quadratures of the received pulse Alpha(i) leading to classical measurement outcomes Xm(i) and Pm(i);
at B, computing an estimate Theta_esti of the relative phase between local oscillator and reference by processing measurement results anterior to i, Xm(j) and Pm(j), over windows of size W wherein 0<i-j<W;
at B, correcting the relative phase drift on quantum information measurement outcomes Xm(i) and Pm(i) by applying phase correction rotation on the raw results based on the Theta_esti estimate and then by compensating the value of the displacement R(i).

4. The method of claim 1, comprising the steps of:
at A, deriving two different optical coherent state pulses QP(i) and RP(i), said two pulses being generated by splitting a single optical pulse produced by LA at cycle i into two pulses and by delaying the second pulse with respect to the first one;
at A, encoding quantum information Q(i) on the quadratures of the optical coherent state QP(i);
at A, encoding phase reference information R(i) on the optical coherent state RP(i), whose quadrature value in phase with LA is displaced by a large value Er coherently with laser LA;
sending coherent states QP(i) and RP(i) from A to B through the optical channel;
at B, deriving two phase-coherent local-local oscillator pulses LLOQ(i) and LLOR(i), said pulses being generated by splitting a single optical pulse produced by LB at cycle i into two pulses and by delaying the second pulse with respect to the first one;
at B, measuring the two quadratures of the received reference pulse RP(i) with a coherent detection wherein the optical pulse LLOR(i) is used as a local-local oscillator LLO mode-matched with RP(i), obtaining measurement outcomes Xrefi and Prefi;
at B, determining the relative phase drift Theta_esti between LA and LB with the quadrature measurement outcomes Xrefi and Prefi;
at B, measuring quantum information Q(i) on the received pulse QP(i) with a coherent detection at cycle i, wherein the optical pulse LLOQ(i) is used as local-local oscillator LLO mode-matched with QP(i), obtaining classical information Qm(i);
at B, correcting Qm(i) with phase correction processing using Theta_esti and determining logical quantum information Q(i).

5. The method of claim 1, comprising the steps of:
at A, deriving two different optical coherent state pulses QP(i) and RP(i), said two pulses being generated by splitting a single optical pulse produced by LA at cycle i into two pulses and by delaying the second pulse with respect to the first one;

at A, encoding quantum information Q(i) on the quadratures of the optical coherent state QP(i);

at A, encoding phase reference information R(i) on the optical coherent state RP(i), whose quadrature value in phase with LA is displaced by a large value Er coherently with laser LA;

sending coherent states QP(i) and RP(i) from A to B through the optical channel;

at B, deriving two phase-coherent local-local oscillator pulses LLOQ(i) and LLOR(i), said pulses being generated by splitting a single optical pulse produced by LB at cycle i into two pulses and by delaying the second pulse with respect to the first one;

at B, demultiplexing or separating QP(i) and RP(i) onto two different optical paths;

at B, measuring the two quadratures of the received reference pulse RP(i) with a coherent detection, wherein the LLOR(i) pulses is used as a local-local oscillator LLO mode-matched with RP(i) obtaining measurement outcomes Xrefi and Prefi;

at B, determining the relative phase drift Theta_esti between LA and LB with the quadrature measurement outcomes Xrefi and Prefi;

at B, physically loop-locking the phase of the LLOQ(i) pulse with the phase of the optical reference pulses RP(i) with a feedback mechanism and the Theta_esti estimate;

at B, measuring the received pulse QP(i) with a coherent detection wherein the phase-locked LLOQ(i) pulses is used as a local-local oscillator LLO mode-matched with RP(i);

at B, determining the quantum information Q(i).

6. A system for coherent optical communication of quantum information between an emitter A and a distant receiver B connected by an optical channel, wherein emitter A comprises a laser LA and wherein receiver B comprises a laser LB used as a local local oscillator LLO to operate a coherent receiver, said system further comprising:

at A, a laser LA configured to derive phase-coherently one or two optical pulses from a same optical wavefront at cycle i, said pulses being self-coherent with the laser LA;

at A, a coherent multiplexed encoder to encode logical quantum information Q(i) and physical phase reference information R(i) onto said one or two self-coherent optical pulses;

an optical channel from A to B configured to send multiplexed Q(i) and R(i);

at B, a multiplexed coherent measurement device configured to measure logical quantum information Q(i) and physical phase reference information R(i) with said one or two self-coherent pulses derived from a single optical wavefront produced by laser LB and used as local oscillator to perform a coherent detection, thereby obtaining classical measurements Qm(i) of Q(i) and Rm(i) of R(i);

at B, a device configured to determine a relative phase Phi(i) at interference at cycle i between Q(i) optical pulse and corresponding LO pulse by estimating the relative phase between R(i) optical pulse and corresponding LO pulse; and at B, a device configured to determine logical quantum information Q(i) by correcting Qm(i) measurement using relative phase Phi(i) estimation.

7. The system according to claim 6 further comprising a heterodyne detector and a local-local oscillator LLO wherein:

information sent from A to B is encoded on a single optical coherent state pulse, derived from the optical wavefront produced by LA at cycle i;

quantum information Q(i) is encoded on both quadratures of the coherent state while phase reference information R(i) is encoded as a displacement of amplitude Delta of the quadrature in phase with LA at cycle i;

a heterodyne detector measures both two quadratures of the received pulse at cycle i at wherein the laser LB is used as a local-local oscillator LLO to produce a coherent state pulse mode matched with the received pulse; and wherein quadrature measurement results are used to estimate the phase drift between LA and LB, and then to determine the quantum information Q(i).

8. The system according to claim 7 further comprising a splitter, an optical delay line and a homodyne or heterodyne detector wherein:

quantum information Q(i) and phase reference information R(i) are encoded onto two different optical coherent state pulses, this two pulses being generated by splitting onto a beamsplitter an optical pulse produced by LA (at cycle i) and by delaying the second pulse by a time DeltaT with respect to the first one, with an optical delay line; quantum information Q(i) is encoded on the quadratures of one of the pulses QP(i); phase reference information R(i) is encoded on the second pulse RP(i) whose quadrature value is in phase with LA and displaced by a value Delta, while its other quadrature value is not modulated;

a measurement DQ of the quadratures of the received pulse QP(i) is performed at a homodyne or heterodyne detector at B at cycle i, with LB used as local-local oscillator to produce a coherent state pulse LLOQ(i) mode-matched with QP(i); a heterodyne measurement DR of the two quadratures of the received reference pulse RP(i) is performed at B at cycle i, the laser LB is used as local local oscillator LLO to produce a coherent state pulse LLOR(i) that is obtained by delaying using a delayline a part of the wavefront used to produced LLOQ(i) by at cycle i with a delay line; the quadrature measurement results obtained with DR are used to determine the phase drift Phii between LA and LB, said determined phase drift being then used to correct the quadrature measurement results of QP(i) and to determine the quantum information Q(i).

9. The system according to claim 8, wherein the coherent detector DQ or the coherent detector DR are different single detectors.

10. The system according to claim 8, wherein the coherent detector DQ and the coherent detector DR are the same coherent detector.

11. The system according to claim 8, wherein the coherent detector DQ OR the coherent detector DR is associated with an intensity of the coherent state pulse LLOR(i) which is decreased with respect to the intensity of the coherent state pulse LLOQ(i).

12. The system according to claim 8, wherein:

quantum information Q(i) and phase reference information R(i) are encoded onto two different optical coherent state pulses, both pulses being coherently derived from the optical wavefront produced by LA at cycle i, the second pulse being delayed with respect to the first one, with an optical delay line;

quantum information Q(i) is encoded on the quadratures of one of the pulses, called QP(i);

phase reference information R(i) is encoded on the second pulse, called RP(i), whose quadrature value in phase with LA is displace by a large value, Delta, while its other quadrature value is not modulated; the phase reference pulse RP(i) is used to operate an optical phase lock-loop OPLL at B, locking the phase of laser LB to the phase of optical reference pulses RP(i) with feedback mechanisms;

a dual-homodyne measurement DQ of the quadratures of the received pulse QP(i) is performed at B at cycle i, with LB used as local local oscillator LLO to produce a coherent state pulse PLLOQ mode-matched with QP(i).

* * * * *